United States Patent [19]
Adam

[11] Patent Number: 6,085,134
[45] Date of Patent: Jul. 4, 2000

[54] ARRANGEMENT FOR CONTROLLING AT LEAST ONE ADJUSTING ELEMENT OF WORK VEHICLE

[75] Inventor: Hagen Adam, Gütersloh, Germany

[73] Assignee: CLAAS KGaA, Harsewinkel, Germany

[21] Appl. No.: 08/901,977

[22] Filed: Jul. 29, 1997

[30] Foreign Application Priority Data

Jul. 27, 1996 [DE] Germany .............................. 196 30 419

[51] Int. Cl.[7] .............................. G06F 7/70; G06F 19/00; G06G 7/00
[52] U.S. Cl. .................................. 701/50; 701/49; 701/35; 172/4.5; 37/414
[58] Field of Search ..................................... 701/1, 41, 49, 701/50, 35; 172/2, 4.5, 9; 37/348, 382, 414; 56/10.2 R, 10.2 A, 10.5; 318/567, 568.1

[56] References Cited

U.S. PATENT DOCUMENTS

| | | | |
|---|---|---|---|
| 3,860,074 | 1/1975 | Maistrelli ..................................... | 172/9 |
| 4,376,298 | 3/1983 | Sokol et al. ............................... | 701/50 |
| 4,558,760 | 12/1985 | Lestradet . | |
| 4,721,001 | 1/1988 | Hesse et al. .......................... | 73/862.57 |
| 4,809,785 | 3/1989 | Arnold et al. ............................... | 172/9 |
| 5,217,083 | 6/1993 | Bachhuber et al. . | |
| 5,270,496 | 12/1993 | Langen ..................................... | 177/147 |

FOREIGN PATENT DOCUMENTS

| | | |
|---|---|---|
| 0 455 003 A1 | 11/1991 | European Pat. Off. . |
| 30 39 975 A1 | 5/1982 | Germany . |
| 33 18 410 A1 | 11/1984 | Germany . |
| 3440625C2 | 5/1985 | Germany . |
| 35 23 775 A1 | 1/1986 | Germany . |
| 86 05 352 U | 12/1987 | Germany . |
| 34 38 497 C2 | 2/1995 | Germany . |
| 44 28 824 A1 | 2/1996 | Germany . |
| 4428824A1 | 2/1996 | Germany . |
| 195 32 203 A1 | 3/1996 | Germany . |

Primary Examiner—William A. Cuchlinski, Jr.
Assistant Examiner—Gertrude Arthur
Attorney, Agent, or Firm—Michael J. Striker

[57] ABSTRACT

An arrangement for controlling at least one adjusting element of a work vehicle has a control unit electrically connectable with adjusting elements, at least one operating element electrically connected with the control unit and operative for actuating a control function processed in the control unit, the control unit being provided with a structure which, in dependence on a sequence provided by an operator, supply adjusting functions as adjusting signals to the corresponding adjusting elements.

25 Claims, 4 Drawing Sheets

ARRANGEMENT FOR CONTROLLING AT LEAST ONE ADJUSTING ELEMENT OF WORK VEHICLE

BACKGROUND OF THE INVENTION

The present invention relates to an arrangement for controlling at least one adjusting element of a work vehicle, in particular a farming tractor.

German patent document DE 34 40 625 C2 discloses an arrangement for controlling at least one adjusting element of a work vehicle with an electrical control unit which controls the turning maneuver of the work vehicle by automatic lifting or lowering of the adjusting element. The control unit has a set of timers which cause successive adjustments of the adjusting element a in fixedly predetermined time sequence. The disadvantage of this arrangement is the use of the arrangement which is limited to the turning process, and the operator during the travel in the work vehicle can not influence the sequence of the adjusting functions.

German document DE 44 28 824 A1 discloses an arrangement for controlling at least one adjusting element, which has a control unit with a set of adjusting functions which run in accordance with a fixedly predetermined program. By actuation of an automatic switch, the control unit is switched to a ready state. With actuation of a further operational switch, the program is started so that subsequently a sequence of control functions are performed by the control element. For example, by the actuation of the operational switch, the lifting mechanism is brought from the working position into the transporting position and simultaneously the differential lock is turned off. The adjustments of further adjusting elements follow, until the work vehicle is transferred into the lifted position. This arrangement also has the disadvantage that the operator has no influence on the sequence of the control functions.

SUMMARY OF THE INVENTIONS

Accordingly, it is an object of present invention to provide an arrangement for controlling at least one adjusting element of a work vehicle, which avoids the disadvantages of the prior art and increases the operational comfort for an operator without occurrence of errors.

With the arrangement in accordance with the present invention, an operator is in a such position that by actuation of an operating element any adjusting functions can be performed automatically in a desired sequence. The operator in a first operating sequence as an input sequence can just manually actuate an operating element sequence selected by him, which then proceeds automatically by actuation of an automatic element. In this way, an automation of the control process is provided so that it is adapted to the individual requirements of the operator. It is advantageous when the requirements of the field processing are taken into consideration in dependence on the weather conditions by additional actuation or control of an adjusting element.

In accordance with the invention, an operating unit is associated with a control unit and includes at least one automatic switch for requesting or starting an automatic sequence and at least one return switch for canceling the automatic sequence. In order to store and then request several automatic sequences, the operating unit has several input, automatic and return switches which correspond to one another.

In accordance with a further embodiment of the present invention, an indicating unit is associated with the control unit. It visualizes adjusting functions to be stored or stored, and therefore the operator can have a control over the running adjusting functions.

In accordance with still another feature of the present invention, the control unit with the operating unit and the indicating unit are integrated in a single structural unit. Preferably, this structural unit is removable from the cockpit of the working vehicle, so that it can be used in accordance with the plug-and-play-technique in several work vehicles with corresponding programming. Preferably, the control unit is connected through a bus system with the operating elements which are fixedly installed in the work vehicle. Therefore, they can be actuatable in the input sequence in a manner desired by the operator.

Finally, in accordance with another embodiment of the present invention, the operator can determine the control functions over the lateral sequence. Since the time intervals between the individually actuated operational elements in an input sequence are determined and stored, the turning process for example can be substantially automated.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

An arrangement in accordance with present invention can be used in work vehicles which are utilized in agriculture, such as for example farming tractors with connected lifting units for self-propelling harvester threshers, such as beet or potato harvesters as well as field choppers.

Figure 1:
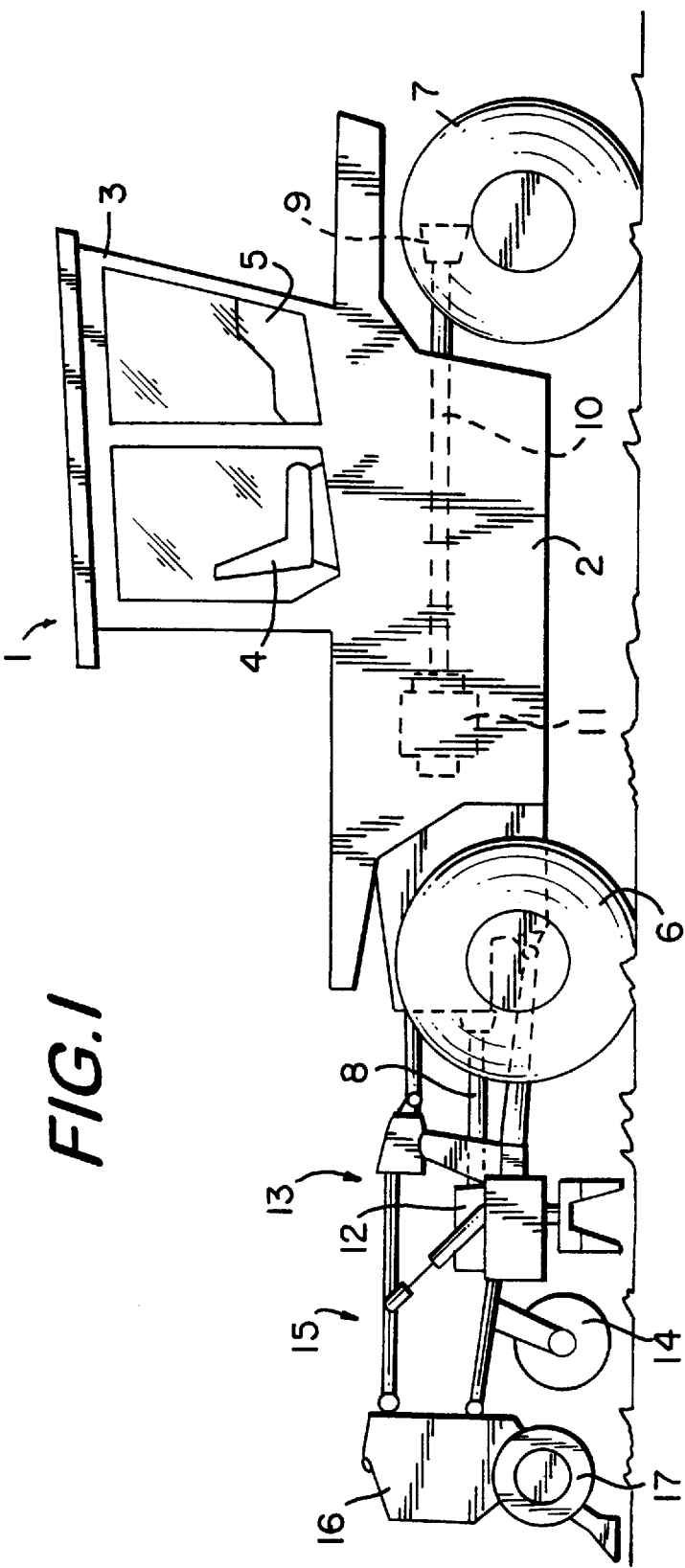
FIG. 1 is a side view of a work vehicle with lifting units arranged on a rear end.

FIG. 1 shows a farming tractor 1 with a chassis 2 and a driver's cabin 3 extending upwardly from it. The driver's cabin 3 has a seat for the operator and a cockpit 5 with not shown operating elements for actuation of a drive or adjusting elements. A not shown drive is arranged in a part of the chassis 2 between the rear wheels 6 and front wheels 7. The drive motor serves for driving rear wheels 6 and the front wheels 7 on one hand, and also for driving a rear power take-off 8 and a not shown front part take-off.

A power take-off connection 9 with a guiding tube 10 with a shaft is used for connection of the front power take-off. It is driven from the drive motor through a transmission 11. The rear power take-off 8 is also connected with the drive motor through a transmission 12. A propeller shaft with a universal joint is articulately connected with the power take-off 8, through which a circular spike harrow is connected. A tracking roller 14 is arranged behind the circular spike harrow 13, so that the working depth of a circular spike harrow can be adjusted by the roller. The circular spike harrow 13 is provided at the rear side with further lifting elements 15. As can be seen from FIG. 1, a sowing machine 16 with supporting running wheels 17 is pivotally connected to the lifting elements 15. The farming tractor 1 has an auto pilot operation. It is therefore possible to automatically drive and steeringly control the farming tractor 1 from one field end to another field end without actions by an operator. For this purpose, the farming tractor 1 is provided with an all wheel steering.

Figure 2:
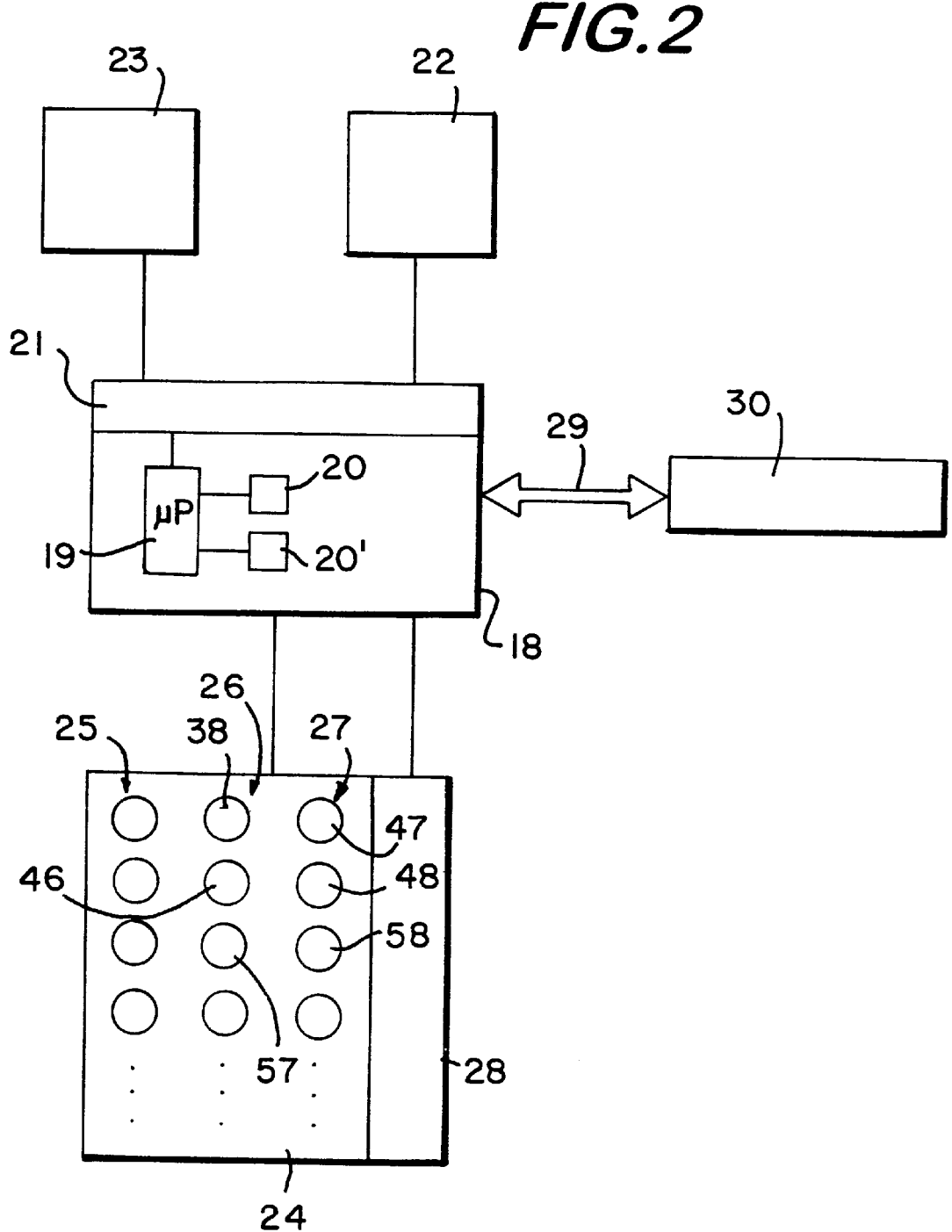
FIG. 2 is a block diagram of an arrangement for controlling at least one adjusting element of a work vehicle in accordance with the present invention.

For increasing the operational comfort, the farming tractor 1 in the region of its cockpit 5 has an arrangement for controlling adjusting elements as shown in FIG. 2. The arrangement includes a control unit 18 with a micro processor 9, a write-read memory 20 (RAM), a read-only-memory 20' (ROM), as well as an interface 21. Through the interface 21, the control unit 18 is connected with a regulating unit 22 which is formed as an electro-hydraulically lifting stroke-regulated hydraulic cylinder-piston unit for controlling lifting or lowering of the lifting elements.

The lifting elements as shown in FIG. 1 can be for example a circular spike harrows 13 or a plow. Furthermore, the control unit 18 is connected with a coupling unit 23 which has a plurality of working couplings for connection with further adjusting elements. Moreover, the control unit 18 is electrically connected with an operating unit 24 which has a set of input buttons 25, a set of automatic buttons 26, and a set of return buttons 27.

The control unit 18 sends adjusting signals to the regulating unit 22 or the coupling unit 23, so that the corresponding adjusting units are controlled as an adjusting members or actuators. Moreover, the control unit is connected with an indicating unit 28 which has an LC display for indication of control-relevant data. Further, the control unit 18 is electrically connected through a bus system 29 with the cockpit operating unit 30. The bus system 29 is formed for example as a CAN bus or as an LBS bus. The cockpit operating unit 30 includes operating elements which are fixedly mounted in the cockpit 5.

The control unit 18 together with the operating unit 24 and the indicating unit 28 are integrated to form a joint structural unit. It has a plug device for a simple connection of the structural unit inside the cockpit 5. Moreover, the control unit 18 is designed so as to be freely programmable. Therefore, it can be connected with each work vehicle via a corresponding connection, for example a bus connection.

Figure 3:
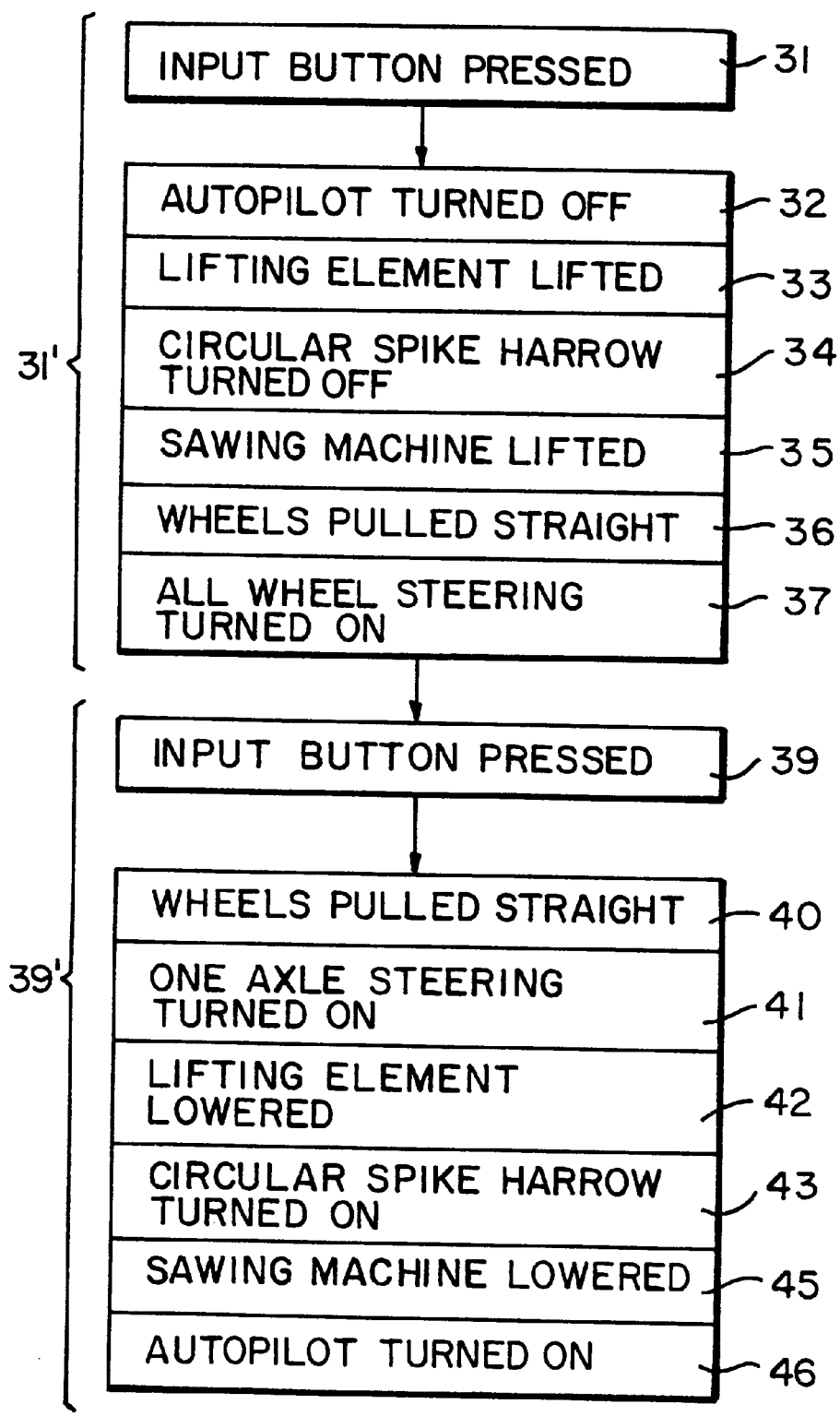
FIG. 3 is a flow chart of an automatically steering work vehicle during a turning process.

The arrangement shown in FIG. 2 provides for a possibility of automation of the control sequence shown in FIG. 3. For this purpose, the operator must actuate during a first working sequence in correspondence with the input sequence plan of FIG. 3, the corresponding operational button for controlling the corresponding adjusting element. The input sequence 31 starts with the actuation of the input button 31. It acts so that by the actuation of subsequent operational buttons, control signals are outputted through the bus system 29 to the control unit 18 and stored in a coded form in a storage region of the RAM memory 20.

For starting a turning process of the farmer tractor 1 as shown in FIG. 1, the operator can provide that subsequently the operating element "Auto pilot turned-off" 32, the operating element 4 "Lifting element lifted" 33, "Circular spike harrow turned-off" 34, "Sowing machine lifted" 35, "Wheels pulled straight" 36 and finally, "All wheel steering turned-on" 37 are actuated one after other. An automatic button 38 is associated with these adjusting functions and can be automatically activated by actuation of this button 38.

After finishing the turning process, an input button 39 is actuated within an input sequence 39'. Subsequently following operating elements are actuated one after the other to return to the working position. The first one is the operating element "Wheels pulled straight" 40, then the operating element "One-axle steering turned on" 41, "Lifting element lowered" 42, "Circular spike harrow turned-on" 43, "Sowing machine lowered" 44, and "Autopilot turned-on" 45. An automatic button 46 is associated with these control functions, so that after actuation of the automatic button 46 these control functions are automatically performed one after the other.

A return button 47 which corresponds to the automatic button 38 and a return button 48 which corresponds to the automatic button 46 are associated with each control sequence. During actuation of the return buttons 47, 48, the storage region of the memory 20 associated with the corresponding input sequence 31', 39' is reset, so that with the buttons 31, 39 new, changed input sequences can be stored.

In accordance with FIG. 2, four control sequences are storable. Alternatively, several sets of input buttons, automatic buttons and return buttons corresponding to one another can be arranged. The control sequence is however ended when the operator actuates a fixedly arranged operating element in the cockpit 5. The operator can then proceed with the control manually.

Figure 4:
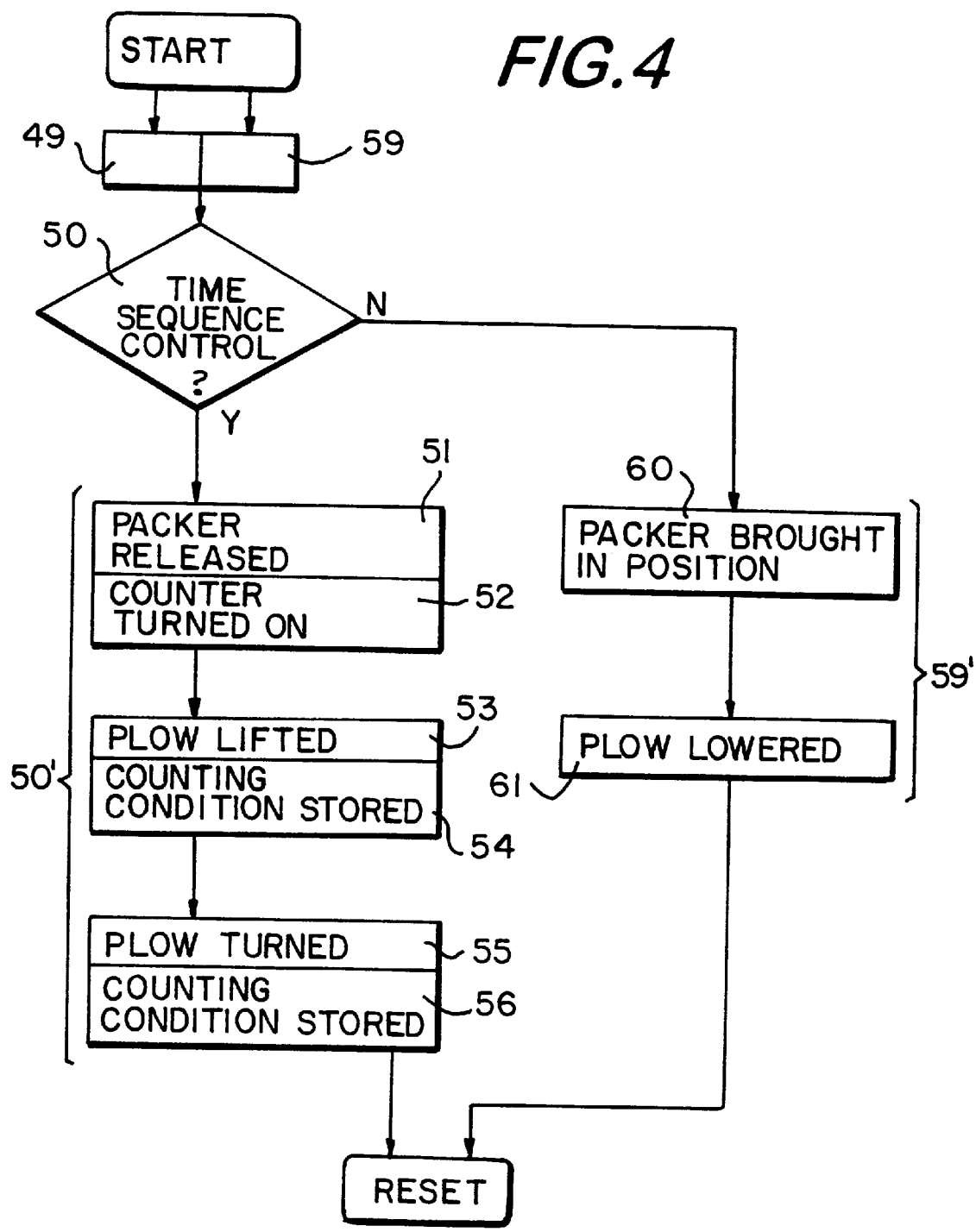
FIG. 4 is a flow chart of an input sequence for a turning maneuver of a work vehicle with a connected plow.

In accordance with a further embodiment as shown in FIG. 4, the turning process of a farming tractor can be automated in a time sequence. For this purpose the control unit 18 has a counter which operates for determination of a time interval between two actuated operational elements. The counter can be formed as an electrical component with tilting members. Alternatively, the counter can be activated by a program which is stored in a ROM memory 20' of the control unit 18.

After actuation of the input button 49 it is inquired through the indicating unit 28 whether a time-dependent input 50 is desired. If the operator confirms this inquiry, then after a beginning of the following input sequence 50' with the actuation of the operating element "Packer released" 51, the "Counter turned-on" 52 is actuated, so that it counts for example forwardly until with actuation of the further operational element "Plow lifted" 53, the next counter state 54 produced at this time is stored in the memory unit 20. With the subsequent operation of the operating element "plow turned" 54 the next counter state is determined, the difference relative to the preceding counter state is calculated, and this value 56 is stored in the RAM memory 20. Thereby, the input sequence 50' is finished. An automatic button 57 is associated with it, with which the stored input sequence 50' can be activated.

A corresponding return button 58 provides, after actuation, resetting of the corresponding storage region of the memory 20. In this manner it is possible during subsequent control sequences activated by the automatic button, to consider also the time sequence and to activate the corresponding control element in the manner desired by the operator. If the time-dependent control is rejected, the same control elements can be actuated without inquiring of the counter state.

A reset is performed after this, so that at a certain time point the second input sequence can start by actuation of an input button 59. After the inquiry whether a time-dependent control is desired, by actuation of the operational button "Packer in position brought" 60 and "Plow lowered" 61, the second input sequence 59' is completed.

Alternatively, in the RAM memory 20 also a plausibility program can be stored. After the actuation of each operating element it tests within the input sequence 50', 59' whether the operating elements are actuated in the correct sequence or whether the actuation of a required operating element is forgotten by the operator. For example, the plausibility program can test whether in accordance with the sequence plan of FIG. 3 the autopilot is turned-off or not at the beginning of the turning process. If the turning-off by the operator is forgotten, it can be made noticeable by a corresponding indication in the indicating unit 28 or by a warning light and/or a further actuation of the operating buttons is automatically blocked.

The control unit 18 is further suitable for storing basic adjustments of the regulating unit 22, for example data of the quantity of a hydraulic fluid or position of a throttle, and making them available for the corresponding control sequence. Moreover, the control can be expanded by storing the drive train controls and regulations with consideration of the changeover of motor characteristics or changing of vehicle strategies and considering the same within the frame of the control program. Moreover, a vehicle steering unit can be provided, which It is connected with the control unit 81 so that the steering of a multi-axle steered vehicle can be automatically controlled.

It will be understood that each of the elements described above, or two or more together, may also find a useful application in other types of constructions differing from the types described above.

While the invention has been illustrated and described as embodied in arrangement for controlling at least one adjusting element of working vehicle, it is not intended to be limited to the details shown, since various modifications and structural changes may be made without departing in any way from the spirit of the present invention.

Without further analysis, the foregoing will so fully reveal the gist of the prsent invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for controlling at least one adjusting element of a work vehicle, comprising a control unit electrically connectable with adjusting elements; at least one operating element electrically connected with said control unit and operative for actuating a control function processed in said control unit, said control unit being provided with means which, in dependence on a sequence provided by an operator, supply adjusting functions as adjusting signals to corresponding ones of the adjusting elements; and comprising an operating unit associated with said control unit so that a sequence of the adjusting functions is storable in said control unit and control functions are inquirable in a predetermined sequence.

2. An arrangement as defined in claim 1, wherein said control unit has a microprocessor and a write-read memory for storing the adjusting functions produced by actuating of said at least one operating element.

3. An arrangement as defined in claim 1, wherein said control unit and said operating unit are integrated to form a joint integral unit.

4. An arrangement as defined in claim 1; and further comprising an indicating unit for indicating the control functions, said control unit, said operating unit and said indicating unit being integrated to form a joint integral unit.

5. An arrangement as defined in claim 1, wherein said operating unit has a plurality of such operating elements with which a series of the adjusting functions are associated.

6. An arrangement as defined in claim 1, wherein said operating unit has at least one input button for storing the adjusting functions provided by an operator.

7. An arrangement as defined in claim 1, wherein said operating unit has at least one automatic button for starting a controlling process.

8. An arrangement as defined in claim 1, wherein said operating unit has at least one return button for resetting stored adjusting functions.

9. An arrangement as defined in claim 8; and further comprising a write-read memory in which the adjusting functions are stored.

10. An arrangement as defined in claim 1; and further comprising indicating element for indicating data of the adjusting functions.

11. An arrangement as defined in claim 1; and further comprising a regulating unit which is connected with said control unit.

12. An arrangement as defined in claim 11, wherein said regulating unit is an electro-hydraulic lifting mechanism regulating unit.

13. An arrangement as defined in claim 1, wherein said control unit has means for producing the adjusting signals so that in dependence on a time sequence provided by an operator the adjusting functions are supplied to said adjusting elements.

14. An arrangement for controlling at least one adjusting element of a work vehicle, comprising a control unit electrically connectable with adjusting elements; at least one operating element electrically connected with said control unit and operative for actuating a control function processed in said control unit, said control unit being provided with means which, in dependence on a sequence provided by an operator, supply adjusting functions as adjusting signals to corresponding ones of the adjusting elements, said control unit being provided with a plug device with conductors for data and address transmission and also for a current supply of said control unit, said plug device being plugable in a receptacle of a cockpit.

15. An arrangement as defined in claim 14, wherein said plug device is formed so that said control unit is connectable through said plug device with a bus system of the work vehicle for transmitting data from said operating element which is fixedly mountable in a cockpit, to said control unit.

16. An arrangement for controlling at least one adjusting element of a work vehicle, comprising a control unit electrically connectable with adjusting elements; at least one operating element electrically connected with said control unit and operative for actuating a control function processed in said control unit, said control unit being provided with means which, in dependence on a sequence provided by an operator, supply adjusting functions as adjusting signals to corresponding ones of the adjusting elements: and further comprising an indicating unit for indicating data of the adjusting functions, said indicating unit having an LC display.

17. An arrangement for controlling at least one adjusting element of a work vehicle, comprising a control unit electrically connectable with adjusting elements; at least one operating element electrically connected with said control unit and operative for actuating a control function processed in said control unit, said control unit being provided with means which, in dependence on a sequence provided by an operator, supply adjusting functions as adjusting signals to corresponding ones of the adjusting elements, said control unit having means for a removable connection in a cockpit.

18. An arrangement as defined in claim 16, wherein said control unit is formed so that it stores hydraulic adjusting functions to supply the hydraulic adjusting functions as the adjusting signals to said regulating unit for controlling said adjusting element.

19. An arrangement for controlling at least one adjusting element of a work vehicle, comprising a control unit electrically connectable with adjusting elements; at least one operating element electrically connected with said control unit and operative for actuating a control function processed in said control unit, said control unit being provided with means which, in dependence on a sequence provided by an operator, supply adjusting functions as adjusting signals to corresponding ones of the adjusting elements; and a regulating unit which is connected with said control unit, said control unit being formed so that it stores hydraulic adjusting functions to supply the hydraulic adjusting functions as the adjusting signals to said regulating unit for controlling said adjusting element.

20. An arrangement for controlling at least one adjusting element of a work vehicle, comprising a control unit electrically connectable with adjusting elements; at least one operating element electrically connected with said control unit and operative for actuating a control function processed in said control unit, said control unit being provided with means which, in dependence on a sequence provided by an operator, supply adjusting functions as adjusting signals to corresponding ones of the adjusting elements; and comprising a regulating unit which is connected with said control unit, said control unit being formed so that it stores a motor-relevant data and supply the data as the adjusting signals to said regulating unit for controlling a drive train of the motor work vehicle.

21. An arrangement for controlling at least one adjusting element of a work vehicle, comprising a control unit electrically connectable with adjusting elements; at least one operating element electrically connected with said control unit and operative for actuating a control function processed in said control unit, said control unit being provided with means which, in dependence on a sequence provided by an operator, supply adjusting functions as adjusting signals to corresponding ones of the adjusting elements; and a regulating unit which is connected with said control unit, said control unit being formed so that it stores a motor-relevant data and supply the data as the adjusting signals to said regulating unit for regulating a drive train of the work vehicle.

22. An arrangement for controlling at least one adjusting element of a work vehicle, comprising a control unit electrically connectable with adjusting elements; at least one operating element electrically connected with said control unit and operative for actuating a control function processed in said control unit, said control unit being provided with means which, in dependence on a sequence provided by an operator, supply adjusting functions as adjusting signals to corresponding ones of the adjusting elements; and a regulating unit which is connected with said control unit, said control unit being formed so that it stores steering-specific data and supplies the steering specific data as the adjusting signals to said regulating unit for controlling a steering of the work vehicle.

23. An arrangement for controlling at least one adjusting element of a work vehicle, comprising a control unit electrically connectable with adjusting elements; at least one operating element electrically connected with said control unit and operative for actuating a control function processed in said control unit, said control unit being provided with means which, in dependence on a sequence provided by an operator, supply adjusting functions as adjusting signals to corresponding ones of the adjusting elements; and the regulating unit which is connected with said control unit, said control unit being formed so that it stores steering-specific data and supplies the steering specific data as the adjusting signals to said regulating unit for regulating a steering of the work vehicle.

24. An arrangement for controlling at least one adjusting element of a work vehicle, comprising a control unit electrically connectable with adjusting elements; at least one operating element electrically connected with said control unit and operative for actuating a control function processed in said control unit, said control unit being provided with means which, in dependence on a sequence provided by an operator, supply adjusting functions as adjusting signals to corresponding ones of the adjusting elements, said control unit having a counter for determination of a time interval between two actuated operating elements.

25. An arrangement for controlling at least one adjusting element of a work vehicle, comprising a control unit electrically connectable with adjusting elements; at least one operating element electrically connected with said control unit and operative for actuating a control function processed in said control unit, said control unit being provided with means which, in dependence on a sequence provided by an operator, supply adjusting functions as adjusting signals to corresponding ones of the adjusting elements, said control unit having a counter program for determination of a time interval between two actuated operating elements.

* * * * *